April 14, 1931.   S. P. MILLER   1,800,224
DISTILLATION PROCESS
Filed March 12, 1925

Stuart P. Miller, Inventor
By his Attorney
Chas. W. Mortimer

Patented Apr. 14, 1931

1,800,224

UNITED STATES PATENT OFFICE

STUART P. MILLER, OF PHILADELPHIA, PENNSYLVANIA, ASSIGNOR TO THE BARRETT COMPANY, A CORPORATION OF NEW JERSEY

DISTILLATION PROCESS

Application filed March 12, 1925. Serial No. 14,944.

This invention relates to a process of distilling liquids in such a manner that the dangers are lessened and the operation may be carried out in a very satisfactory manner. In prior processes of distilling liquids, troubles have often arisen because of unequal distribution of heat through the material thus causing local overheating and sometimes also causing the still bottom to be burned out as well as injuring the product being distilled. The usual process of distillation also often results in decomposing in an objectionable manner some of the products of distillation and likewise decreases the amount of valuable products that should be recovered. In order to obviate some of these difficulties, provision is sometimes made to agitate the liquid that is being distilled by mechanical means such as a propeller or stirrer, for example, or gas or air is passed through the liquid to aid agitation thereof. Mechanical agitation is often unsatisfactory and gas or air agitation gives rise to difficulties in maintaining a vacuum and in requiring larger capacity condensers for condensing the volatile products from the distillation mass.

By the present invention the liquid is kept well agitated during the distillation of the same and at the same time no increase in the size of the condenser is required and the products can be fractionated by passing the same through a fractionating column. The yield of distillation products is increased, the amount of decomposition is lessened, the distillation residue is kept in a more desirable condition and danger of destroying the still is less apt to arise.

Figure 1:
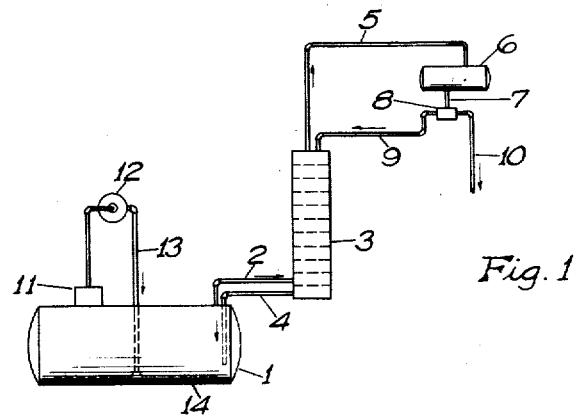
Figure 2:
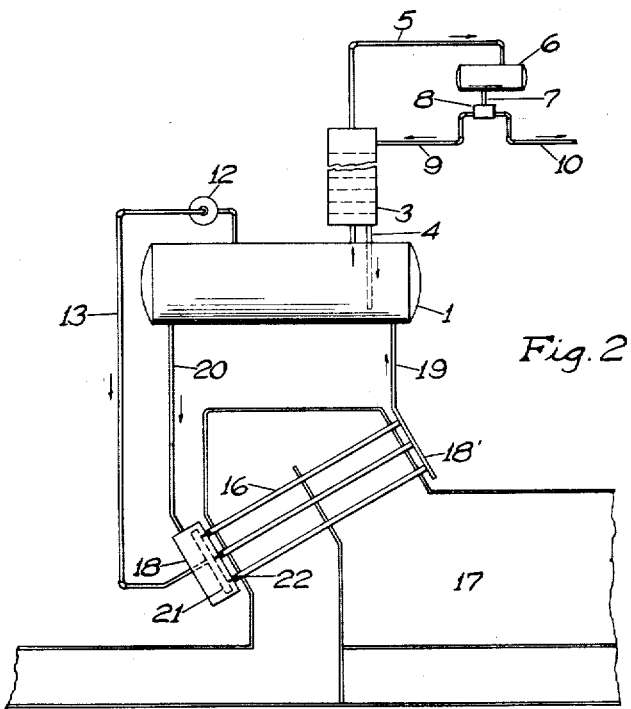

The invention will be understood from the description in connection with the accompanying drawings in which Fig. 1 is a somewhat diagrammatic illustration of an arrangement of apparatus for carrying out the process; and Fig. 2 is an arrangement of a modified form of apparatus for doing the same.

In the drawings reference character 1 indicates an ordinary still which may be heated in any of the convenient well known manners. A pipe 2 leads from the upper portion of the still to a fractionating column 3 from which the condensate is removed through the pipe 4 while the uncondensed vapors pass through the pipe 5 into the total condenser 6. The condensates from the condenser 6 pass through the pipe 7 into the divided flow box 8, a portion passing back into the column 3 through the pipe 9 to operate as back flow in the fractionating column while the remainder passes through the pipe 10 into a receiver for future use.

The still 1 is provided with a dome 11 into which dome a portion of the vapors collects from the liquid that is being distilled in the still 1. A pump 12 takes the vapors from above the level of the liquid in still 1 and forces the same through the pipe 13 into the distributor 14 that is located near the bottom of the still. In this manner a portion of the vapors that rise from the liquid in the still is injected beneath the liquid thus serving to agitate the same. In this way no gas or vapors from an external source are introduced into the system and the liquid in the still 1 is at all times being agitated by vapors that are volatile near the instant temperature of the liquid. Due to the fact that no additional gases or vapors are introduced into the system, an ordinary fractionating column can be used as indicated in the drawing.

In the modification shown in Fig. 2 the still 1 is provided with distillation tubes 16 that are located in a heating zone. In Fig. 2 the tubes are shown located so that the products of combustion from the combustion chamber 17 will come into contact with the outside of the tubes 16 and heat the same. These tubes 16 terminate at their respective ends in headers 18 and 18' that are connected by means of the pipes 19 and 20 to the lower side of the still 1 near the respective ends thereof. The vapors from the still 1 are forced by means of the pump 12 through the pipe 13 into the distributor 21 from which the vapors pass through the outlets 22 into the lower ends of the tubes 16 and aid the circulation.

This process has been found to be especially useful in the distillation of tar as priming or excessive foaming during the removal of the water is obviated, the yield of oil as distillate from the tar is increased and coking of the residue is obviated.

I claim:

1. In the process of distilling a body of tar in a shell still below a temperature at which substantial decomposition and cracking of the tar takes place, the step which comprises withdrawing a portion of the vapors from said body of tar, which vapors are in substantial equilibrium with the boiling tar in the still and contain substantially no fixed gas, directly passing said vapors into substantially the base of said body of tar to agitate said tar, fractionating another portion of said vapors, and returning the refluxed condensate to be re-distilled.

2. In the process of distilling a body of tar in a shell still below a temperature at which substantial decomposition and cracking of tar takes place, the step which comprises withdrawing a portion of the vapors from said body of tar, which vapors are in substantial equilibrium with the boiling tar in the still, and contain substantially no fixed gas, directly passing said vapors into substantially the base of said body of tar to agitate said tar and withdrawing another portion of said vapors.

In testimony whereof I affix my signature.

STUART P. MILLER.

the water is obviated, the yield of oil as distillate from the tar is increased and coking of the residue is obviated.

I claim:

1. In the process of distilling a body of tar in a shell still below a temperature at which substantial decomposition and cracking of the tar takes place, the step which comprises withdrawing a portion of the vapors from said body of tar, which vapors are in substantial equilibrium with the boiling tar in the still and contain substantially no fixed gas, directly passing said vapors into substantially the base of said body of tar to agitate said tar, fractionating another portion of said vapors, and returning the refluxed condensate to be re-distilled.

2. In the process of distilling a body of tar in a shell still below a temperature at which substantial decomposition and cracking of tar takes place, the step which comprises withdrawing a portion of the vapors from said body of tar, which vapors are in substantial equilibrium with the boiling tar in the still, and contain substantially no fixed gas, directly passing said vapors into substantially the base of said body of tar to agitate said tar and withdrawing another portion of said vapors.

In testimony whereof I affix my signature.

STUART P. MILLER.

CERTIFICATE OF CORRECTION.

Patent No. 1,800,224.    Granted April 14, 1931, to

STUART P. MILLER.

It is hereby certified that error appears in the printed specification of the above numbered patent requiring correction as follows: Page 1, line 76, after the word "liquid" insert the words and are therefore in equilibrium with the boiling liquid in the still; and that the said Letters Patent should be read with this correction therein that the same may conform to the record of the case in the Patent Office.

Signed and sealed this 26th day of May, A. D. 1931.

(Seal)

M. J. Moore,
Acting Commissioner of Patents.

CERTIFICATE OF CORRECTION.

Patent No. 1,800,224.                               Granted April 14, 1931, to

STUART P. MILLER.

It is hereby certified that error appears in the printed specification of the above numbered patent requiring correction as follows: Page 1, line 76, after the word "liquid" insert the words and are therefore in equilibrium with the boiling liquid in the still; and that the said Letters Patent should be read with this correction therein that the same may conform to the record of the case in the Patent Office.

Signed and sealed this 26th day of May, A. D. 1931.

(Seal)

M. J. Moore,
Acting Commissioner of Patents.